Dec. 27, 1927.  1,654,511
D. L. GALUSHA
ELECTRICAL INTERLOCKING MECHANISM
Filed April 3, 1924    4 Sheets-Sheet 1
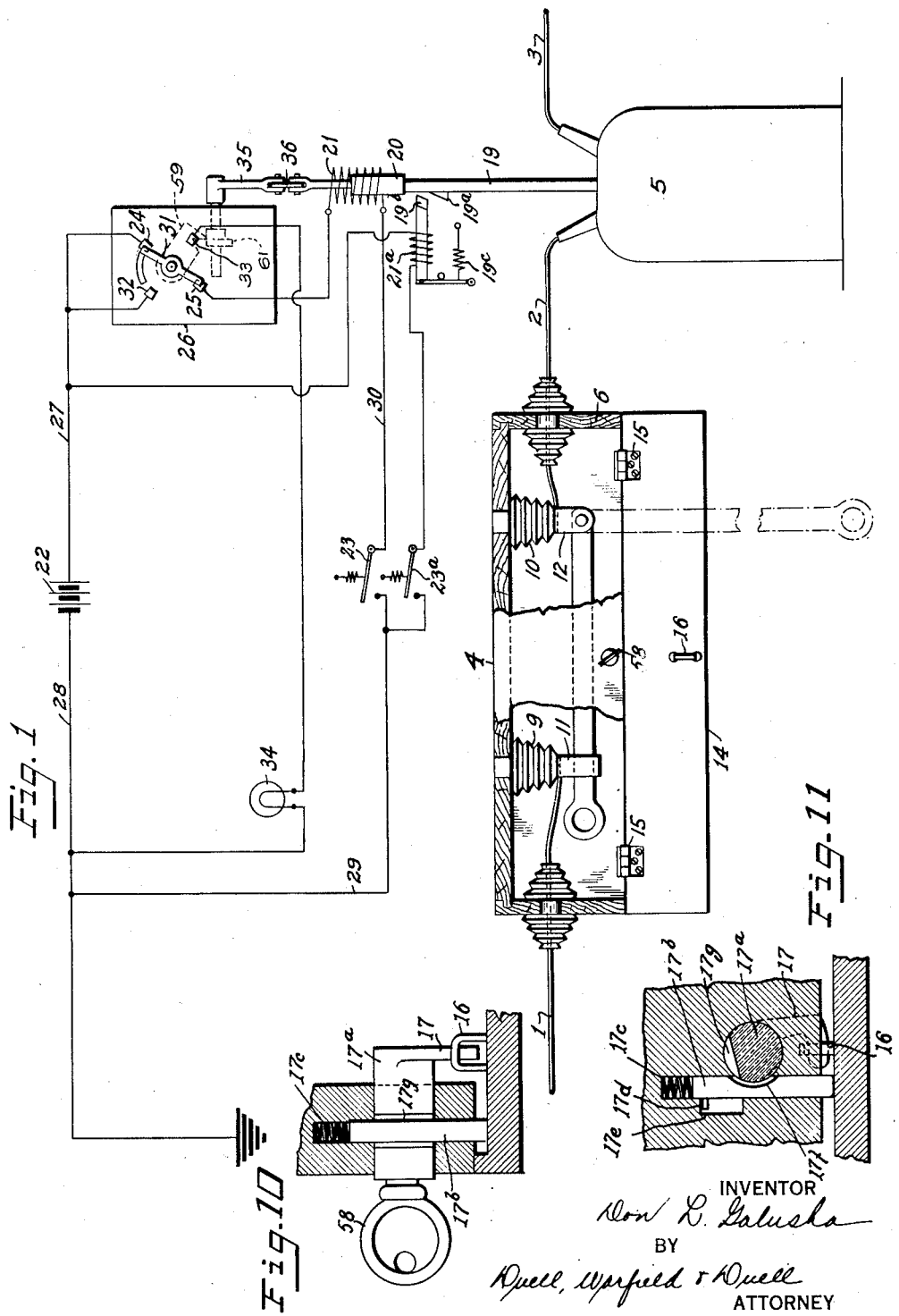

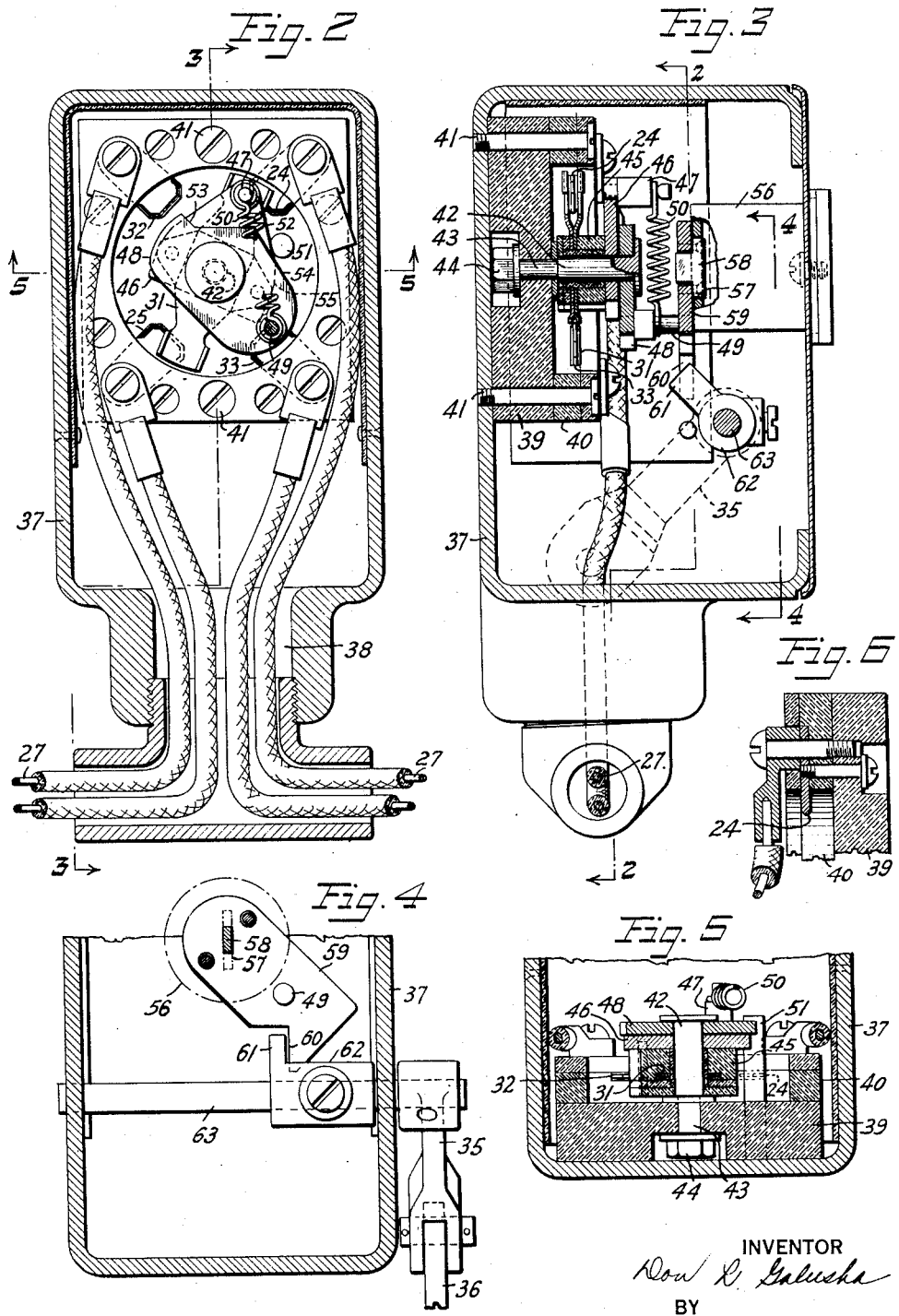

Dec. 27, 1927.  1,654,511
D. L. GALUSHA
ELECTRICAL INTERLOCKING MECHANISM
Filed April 3, 1924   4 Sheets-Sheet 3

INVENTOR
Don L. Galusha
BY
Duell, Warfield & Duell
ATTORNEY

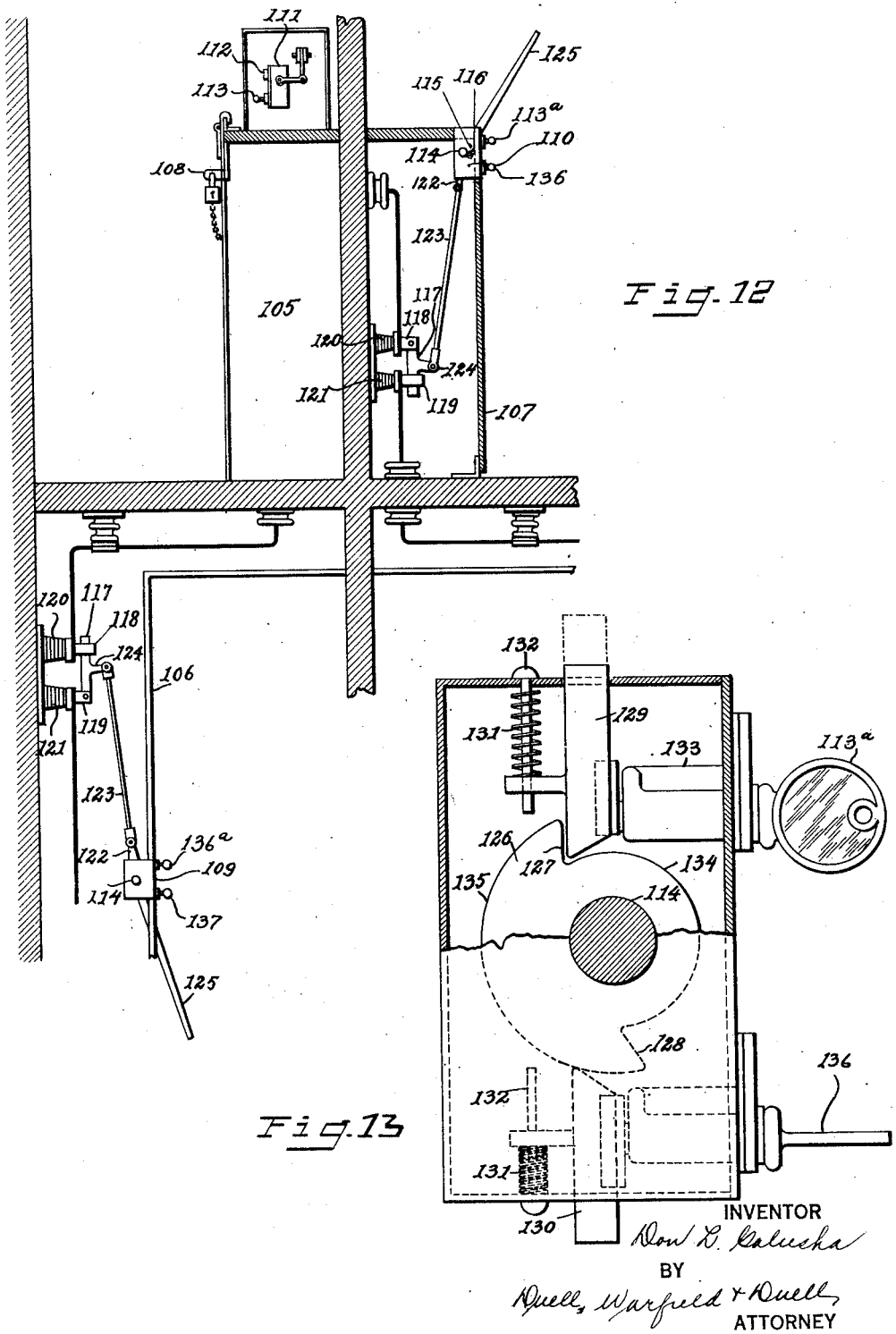

Patented Dec. 27, 1927.

1,654,511

UNITED STATES PATENT OFFICE.

DON L. GALUSHA, OF BRONXVILLE, NEW YORK.

ELECTRICAL INTERLOCKING MECHANISM.

Application filed April 3, 1924. Serial No. 703,890.

This invention relates to apparatus for the control of electrical systems.

An object of this invention is to insure the safety of the employees and of the apparatus in electric installations.

A further object is to provide the system which will insure the proper operation of electrical installations whereby the apparatus designed for the purpose of safety will function properly at all times.

A further object is to provide apparatus whereby access to electrical machinery will be prevented under undesirable or dangerous conditions, and more particularly whereby disconnect apparatus such as a fuse, or disconnect switch may not be operated while current is flowing through it.

A further object is to provide an interlock for disconnect switches which is simple to manufacture and efficient in operation.

Other objects of the invention will in part be obvious and will in part appear hereinafter.

The invention accordingly comprises the features of construction, combination of elements and arrrangement of parts which will be exemplified in the construction hereinafter set forth and the scope of the application of which will be indicated in the claims.

In accordance with this invention an electrical apparatus such as a disconnect switch, a fuse, a transformer or other piece of machinery may be so governed that the disconnect switch cannot be opened or the fuse cannot be replaced or the transformer or other machinery cannot be inspected or repaired or governed in any other desirable way, until the circuit is properly under control.

The governing apparatus will be of any form suitable to the carrying out of the governing function intended, as for example, if it is desired to prevent the operation of a switch, a lock may be employed, or it may be placed in a locked enclosure.

The circuit controlling means will be of a type to control the circuit in accordance with the particular installation in which the invention is to be employed. A convenient form of such controlling means comprises a main switch, as for example, an oil switch which is adapted to open the circuit. This may be so arranged that when it is closed, it prevents the operation of the governing means, and in turn when the governing means has been operated, the switch may not be closed until the governing means is restored.

For a fuller understanding of the nature and objects of the invention reference should be had to the following detailed description taken in connection with the accompanying drawing, in which:

Figure 1 is a diagrammatic representation of the apparatus at an electrical installation, illustrating the invention;

Fig. 2 is a section along the line 2—2 of Fig. 3 of a circuit controller forming a part of the invention;

Fig. 3 is a section along the line 3—3 of Fig. 2 of the controller;

Fig. 4 is a section along the line 4—4 of Fig. 3;

Fig. 5 is a section along the line 5—5 of Fig. 2;

Fig. 6 is a fragmental section at the corner, showing the manner in which the contacts are secured in place;

Figure 7:
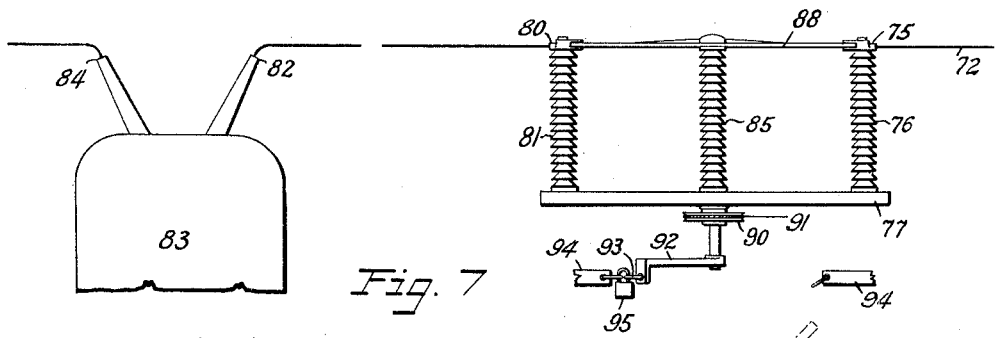
Figure 8:
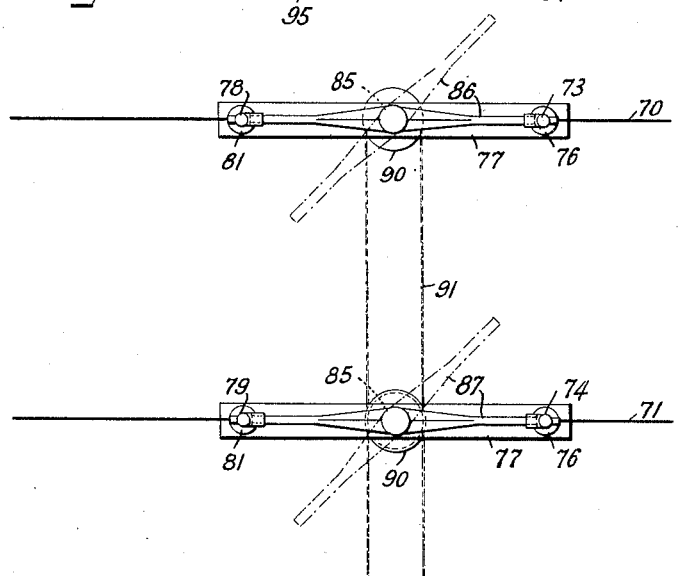
Figure 9:
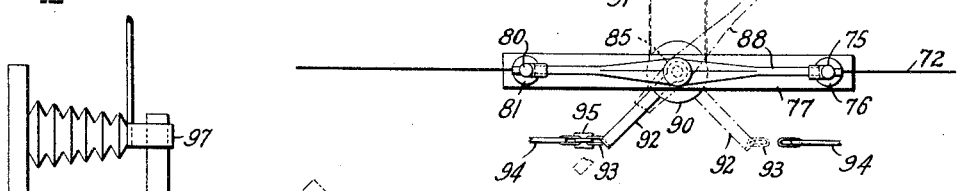

Figs. 7, 8, and 9 are modifications;

Figs. 10 and 11 are details of a form of locking mechanism which may be employed for the disconnect switch as shown in Fig. 1.

Fig. 12 illustrates the application of the invention to an installation in which there is employed a plurality of apparatus adapted to be operated in sequence; and Fig. 13 is a view partly in section of the locking mechanism which may be employed.

In the drawings the numerals 1, 2, and 3 indicate high tension conductors in series for conducting current respectively from the source of power to a current breaker or disconnect switch 4, from the disconnect switch to a main or oil switch 5, and from the oil switch to the distributing system respectively, the disconnect switch being provided with means for preventing its operation in improper sequence. This may be provided effectively in the form of a box or casing 6, which may be of masonry or concrete, for the disconnect switch to which access may be had only when the main switch is open. As illustrated in Fig. 1, the front wall of the box is broken away at both ends to expose the interior. In the end walls of the casing 6, there are mounted suitable insulators for leading in the high tension conductors, while insulators 9 and 10 are provided on a side wall to support pedestals 11 and 12 of a knife-blade type disconnect switch 13. This casing 6 may be provided with a hinged door or closure 14, here shown as another side wall hinged at 15 to the one in the rear. In order that this casing may be locked closed, there is provided a suitable locking mechanism which may be, for example, a staple 16 upon the door reoperating with a movable hook 17 upon the front wall. This mechanism is arranged to be operated by a removable element or key 58 to cause the staple to engage the hook and thereby prevent access to the disconnect switch, and vice versa.

As illustrated in Figs. 10 and 11, the lock may take the form of a lock cylinder 17$^a$, having a suitable slot to receive the key 58, and provided with the usual pins (not shown) to cooperate with the particular key employed. The cylinder as shown carries the hook 17 at its inner side and is so positioned that as the cylinder is rotated, the hook will be caused to engage with and be disengaged from the staple 16.

In certain embodiments of this invention, it is desirable that the key 58 may be removed from the lock only when the door of the disconnect switch compartment is closed. This may be accomplished by providing a sliding pin 17$^b$ within a recess, which pin is urged outwardly by a spring 17$^c$. This pin is provided with a small guide pin 17$^d$ moving in a slot 17$^e$ of such shape and dimensions as to prevent rotation of the pin and to permit it to move in and out of its recess as the cover 14 is opened and closed. This pin 17$^b$ is provided with a circular recess 17$^f$ at a point opposite the lock cylinder when the pin is at its innermost position, and the lock cylinder is provided with a corresponding segmental groove 17$^f$ in a position opposite to the pin when the lock is open. The pin 17$^b$ and the cylinder 17$^a$ are so positioned that the cylinder may be rotated only when the pin 17$^b$ is retracted. By this arrangement, it will be evident that as soon as the locked compartment is opened by turning the cylinder 17$^a$ by the key 58, that the cover will open and the pin 17$^b$, which has up to that time been held retracted by the cover, will be projected outwardly, whereupon its solid portion coming within the groove 17$^f$ of the cylinder will prevent the removal of the key by returning the cylinder to the locking position until the cover has been closed.

The oil switch is provided with power operating means, here illustrated as a plunger rod 19 having at its upper end an armature 20 so positioned as to be raised by a solenoid 21. A catch may be provided as for example a projection 19$^a$ adapted to be engaged by a latch 19$^b$ projected by a spring 19$^c$ such that when the rod 19 is raised to close the switch, it will be retained in its closed position by the latch 19$^b$.

The solenoid 21 is in a circuit comprising wires 27, 28, 29, and 30, energized by the battery 22 or other electric source of E. M. F. disposed in series with a spring operated switch 23 and contacts 24 and 25 of the controller 26. This circuit is so arranged that when the switch 23 closes the circuit, the controller 26 being closed, the solenoid 21 will pick up the armature 20 and close the oil switch 5, thereby connecting conductors 2 and 3. The switch 23 will immediately open but the oil switch will remain closed because of the latch 19$^a$ and 19$^b$.

The solenoid 21$^a$ is in circuit with the battery 22 and a spring operated switch 23$^a$ such that upon closing the switch 23$^a$ the latch 19$^a$ will be withdrawn to release the rod 19, whereupon the oil switch may be returned to open position, by suitable means as by a spring.

The controller 26 is provided with a contact arm 31 which is rotatably mounted to be swung to and from a position to bridge the contacts 24 and 25. By this arrangement it will be seen that the oil switch is under control of the spring switch 23 only when the controller is in an appropriate position.

The controller 26 is preferably provided with a second set of contacts 32 and 33 which are disposed in series with the battery 22 and a signaling device, as for example. a signal lamp 34; these contacts being so positioned that, when the contact arm 31 is in position to open the circuit between the contacts 24 and 25, it will close the circuit between the contacts 32 and 33 to operate the signal 34.

It will not usually be desired that the controller 26 be used to operate the oil switch 5, and to this end it is preferably provided with mechanism whereby the contact arm 31 cannot open the solenoid circuit except when the solenoid is de-energized. An interlocking mechanism is employed to this end which, as here shown, comprises an arm 35 upon the controller, movable from a position which prevents the rotation of the arm 31 as will be set forth more fully below, this arm being operated by a link 36 connecting it with the operating rod 19 of the oil switch, so that when the operating rod is raised by the solenoid 21 the arm 35 will be moved to a position to prevent the controller opening the solenoid circuit, but when the operating rod 19 drops, the arm 35 is restored to a position to permit such operation.

The mechanism of the controller illustrated will now be described.

The controller comprises a casing 37 of general box shape but having at one side thereof an opening 38 through which wires or conductors may be introduced. In the interior of the casing is fitted an insulator 39 of generally square formation and to it is attached a second insulator 40 of similar size and shape save that it has a circular recess therein to receive the arm 31 as will be later described. The insulators 39 and 40 may be held to the casing by suitable screws 41.

A shaft 42 has its reduced end 43 extending through a corresponding opening in the insulator 39 and is held in place by a nut 44. This shaft is disposed along the axis of the circular recess in the insulator 40.

On the shaft 42 are journaled a hub 45 carrying the contact arm 31 and a circular control arm 46 carrying on its outer end a pin 47. A second member 48 is also journaled upon the shaft 42 independently of the hub and this member also carries a pin 49. The pins 47 and 49 are connected by a strong spring 50. A post or stop member 51 is arranged to engage surfaces 52, 53, 54 and 55, to limit the movement of the hub 45 and the control arm 46. The stop member 51 and the stopping surfaces on the respective parts just mentioned are so arranged that the normal rocking of the member 46 from its one extreme position to the other will throw the spring 50 over dead center and this spring is of sufficient force to snap the contact arm 31 from its one extreme position to the other after that dead center is passed. It will then be seen as the member 46 is rotated during movement the first effect of the increased spring tension is to hold the contact arms in still closer contact with the contacts. When, however, the spring has passed over dead center, as just described, the effect of the spring is reversed and it exerts its force to move the contact arm to the other position and it immediately snaps back.

The controller is provided with a locking cylinder 56 having a rotatable barrel and a keyhole at 57 into which the key element indicated at 58 may be inserted to rotate the barrel. Rotating with the barrel is an arm 59 which is recessed to receive the pin 49. The arm 59 has an extension 60 movable into and out of the path of movement of the lug 61 of a sleeve 62, mounted on a shaft 63 upon which the arm 35 is mounted. This lug is so arranged that when the arm 19 is raised, it will move into the path of movement of the projection 60, as shown in Figs. 3 and 4, whereby rotation of the barrel and its associated mechanism is prevented; when the arm 19 is dropped, however, the projection is then free to be moved to its protracted position and thereby permit the rotation of the barrel and its associated mechanism. Thus it will be seen that the key element can rotate the barrel of the cylinder 56 from the position shown in Figs. 3 and 4 only when the rod 19 is depressed.

When the lock cylinder is in the position shown in Fig. 4, the key cannot be moved therefrom but when that cylinder is rotated, the key may be removed; this key 58 being also adapted to operate the locking means 16—17 as has been described.

The operation of this invention when embodied in the above construction is as follows: The oil switch is normally operated by the spring operated switches 23 and 23ª, of a control-circuit which is itself rendered operative or inoperative by the presence of the key 58. If it be desired to open the disconnect switch, it is necessary first to open the oil switch by closing switch 23ª to energize the control-circuit to actuate the solenoid 21ª. When the oil switch has opened the arm 35 will move to the full line position shown in the drawing, thereby withdrawing the lug 61 from engagement with the arm 59. The contact arm 31 of the control-circuit is now free to be actuated by the key element. We then turn the key 58 to rotate the lock cylinder 56 in order to remove the key therefrom and finally employ the key to open the latch at 17 before access may be had to the casing 6 to open the disconnect switch.

It is thus seen that the act of rotating the key 58 in the cylinder 56 and removing it has snapped the contact arm 31 to open the circuit of the solenoid 21 and has closed the circuit of the signal 34. Under such circumstances the signal light 34 by its constant burning will indicate that the oil switch is locked open and with the circuit in this condition, the operation of the hand switch 23 in the control-circuit will produce no effect as the circuit is opened at the controller.

The high tension circuit including the oil switch is closed by first closing the disconnect switch, locking its compartment, removing the key, inserting it in the controller and rotating the control cylinder. Thereafter the movement of the oil switch is under the control of the hand switch 23.

The key 58 may be arranged so that it can only be removed from the cylinder 17ª with the lock in closed position and the cylinder 17ª cannot be turned to a closed position until the pin 17ᵇ is depressed. It is thus necessary to close the compartment before the key can be released.

Figs. 7 and 8 show another embodiment of the invention as appiled to the locking of a disconnect switch by a main switch control mechanism. In this embodiment the incoming energy is received on conductors 70, 71 and 72 connected to terminals 73, 74 and 75, each of which is supported by a suitable insulator 76 from a base 77. A similar set of terminals 78, 79 and 80, similarly supported by insulators 81 may be connected to the input side 82 of an oil switch 83 having an output terminal 84.

Rotatably mounted midway between the pairs of terminals 73—78 and 74—79 and 75—80 is another set of insulators 85, each carrying on its upper end a conducting knife blade 86, 87, 88, each arranged and adapted to rotate with its rotatable insulator from a position to bridge between its corresponding pair of terminals to a position opening the circuit.

Arrangements may be made for simultaneously locking the several arms 86, 87, and 88, as for example, pulleys 90 may be mounted upon their shafts and connected by a suitable belt or chain 91. A handle 92 attached to one of these shafts is provided with a link 93 which may be locked to a stationary portion of the framework 94 by means of a padlock 95. As illustrated, the switch is locked in the closed position.

The modification of Fig. 9 illustrates a different type of disconnect switch in the form of a blade 96 making contact between terminals 97—98 to the latter of which it is pivoted. An insulating link 99 connects the knife with one arm 100 of a bell crank lever 101 having an operating handle 102. This bell crank lever is arranged so that its rotation will swing the knife 96 from the solid line position of Fig. 9 to close the circuit to the dotted line position to open it.

The bell crank lever may be provided with an arm 103 which may be locked to a stationary portion of the framework 104 by a padlock 105.

The form of switch control means illustrated in Figs. 2 to 6 is suitable for use with these disconnect switches of Figs. 7 to 9 and may be associated with the oil switch 83 in the manner already described in connection with the oil switch of Fig. 1, and the locking mechanism for the disconnect switch may be conveniently arranged to be controlled by the operation of the main switch in the manner already described in connection with Fig. 1.

In the modification of Figs. 12 and 13, the invention is applied to the interlocking of a plurality of apparatus, as for instance, in many installations, it is desirable to place a disconnect switch on both sides of an oil switch.

In this modification there is represented at 105 a compartment adapted to contain an oil switch. At 106 and 107 respectively are shown compartments adapted to contain disconnect switches. Each of these compartments is closed by locking mechanisms 108, 109 and 110. Suitably mounted relative to the oil switch in the compartment 105 is a circuit controller 111 which may be similar in character to the circuit controller 26 in Fig. 1. In the particular embodiment shown, a signal 112 corresponding to the signal 34 in Fig. 1 is mounted directly upon the circuit controller. The numeral 113 designates the key by which the controller is operated corresponding to the key 58 of the circuit of Fig. 1.

The structure in the compartments 106 and 107 may be identical and only one need therefore be described.

The locking mechanism for the compartments 106 and 107 may be so arranged that the one is operable only after the oil switch has been opened, while the operation of the other will succeed that of the first. As illustrated, each of these locking mechanisms includes a shaft 114 extending from side to side of the compartment and journaled in the side walls, carrying hooks 115 adapted to engage lugs 116 on the door of the compartment.

The disconnect switch comprises a knife blade 117, connecting between terminals 118 and 119 to one of which it is pivoted. These terminals 118 and 119 may be supported on suitable insulators 120 and 121. Mounted upon the shaft 114 is a crank arm 122 connected by a link 123 to a bell crank arm 124 on the knife blade 117. Mounted also on the shaft 114 is an operating handle 125 and the parts are so arranged that upon lifting the operating handle, the shaft 114 will be rotated to unlock the door of the compartment and simultaneously open the knife blade switch.

Means are provided for preventing the operation of the operating handle 125 until the oil switch has been opened, comprising a locking disc 126 fastened upon the shaft 114 having a pair of projections 127, 128 engaging alternatively with locking dogs 129, 130.

These dogs being both alike one only need be described. The dog 129 is mounted for sliding movement toward and away from the shaft 114 and may, if desired, be urged inwardly toward the shaft by a spring 131 retained by a pin 132. This dog is operated by a key controlled lock cylinder 133 in such a manner that by rotating the cylinder, the dog may be withdrawn from or projected into the pathway of the projection 127. The locking dogs 129 and 130 and the projections 127 and 128 are so arranged relative to each other that when the oil switch is completely open, the dog 129 may rest upon the small circumference 134 of the disc 126 having passed beyond the projection 127 as shown in full lines in Fig. 13. Owing to the engagement between this dog and this projection, the shaft 114 cannot be rotated to close the oil switch until the dog 129 has been withdrawn.

With the parts in this position, the dog 130 will rest upon the larger circumference 135 of the disc 126 and because of its engagement therewith and its connection to its locking cylinder 136, the latter cannot be rotated to permit the removal of the key.

With this mechanism, it will be clear that, with the shaft in either extreme position, one key is retained within the apparatus while the operation of the shaft is within the control of the other key.

In the system as a whole, the numbers 113 and 113ᵃ designate different positions of the same key, and similarly 136 and 136ᵃ designate different positions of another key, while 137 is a third key adapted to operate the locking mechanism 108. In opening the circuit, it is first necessary to open the oil switch before the key 113 may be removed form the controller 111. Thereupon the lock 110 may be opened by inserting this key in the position 113ᵃ; the key 136 may now be removed from the lock 110 and inserted in the position 136ᵃ to permit the opening of the second disconnect switch, whereupon the key 137 is released and may be used to open the lock 108, in case it is desired to gain access to the mechanism of the oil switch. Neither disconnect switch may be closed until its key has been replaced and this key may not be obtained except by completing the previous operation. Thus it will be clear that a prescribed sequence of operations is necessitated and that the parts may be restored only by pursuing this sequence in reverse order.

Since certain changes in carrying out the above process and in the construction set forth, which embody the invention, may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. In an electrical distributing system, the combination with a main circuit-interrupting device and a cooperating device, of means affording and preventing operation of said last named device having a locking agent adapted to lock said means in the preventing condition, a key element adapted for actuating said locking agent, said locking agent being arranged to permit removal of said key element therefrom only when said means is in the preventing condition, a controller for said circuit interrupting device having a movable member adapted to be moved into one position whereby said main circuit-interrupting device is operative and into another position whereby said main circuit-interrupting device is rendered inoperative to close the circuit, said movable member being formed to be actuated by said key element and arranged to prevent its removal therefrom, except when in said operative position, and means for preventing movement of said movable member to the inoperative position when said main circuit-interrupting device is closed.

2. In an electrical distributing system, the combination with a main circuit-interrupting device and a cooperating device, of means affording and preventing operation of said last named device having a locking agent adapted to lock said means in the preventing condition, a key element adapted for actuating said locking agent, said locking agent being arranged to permit removal of said key element therefrom only when said means is in the preventing condition, a controller for said circuit interrupting device having a movable member adapted to be moved into one position whereby said main circuit-interrupting device is operative and into another position whereby said main circuit-interrupting device is rendered inoperative to close the circuit, said movable member being formed to be actuated by said key element and arranged to prevent its removal therefrom, except when in said operative position, an interlocking mechanism actuated by said circuit interrupting device for engagement with said movable member when said main circuit-interrupting device is in closed position whereby to prevent movement of said movable member to inoperative position when said circuit interrupting device is closed.

3. In an electrical distributing system, the combination with a main switch and a disconnect switch, of means affording and preventing operation of said disconnect switch having a locking device adapted to lock said means in the condition preventing switch operation, a key element adapted for actuating said locking device, said locking device being arranged to permit removal of said key element therefrom only when said means is in the condition preventing switch operation, means for operating said main switch, a controller therefor having a movable member adapted to be moved into positions for rendering said means operative and inoperative to close said main switch, said movable member being formed to be actuated by said key element and arranged to prevent the removal of said key element therefrom when in said operative position and to permit removal therefrom when in said inoperative position, and means actuated by said main switch for preventing movement of said movable member to inoperative position when said main switch is closed.

4. In an electrical distributing system, the combination with a main switch and a disconnect switch, of means affording and preventing operation of said disconnect switch having a locking device adapted to lock said means in the condition preventing switch operation, a key element adapted for actuating said locking device, said locking device being arranged to permit removal of said key element therefrom only when said means is in the condition preventing switch operation, means for operating said main switch, a controller therefor having a movable member adapted to be moved into positions for rendering said means operative and inoperative to close said main switch, said movable member being formed to be actuated by said key element and arranged to prevent the removal of said key element therefrom when in said operative position and to permit removal therefrom when in said inoperative position, an interlocking mechanism actuated by said main switch adapted to engage with said movable member when said main switch is closed for preventing movement of said movable member to inoperative position when said main switch is closed.

5. In an electrical distributing system, the combination with a main switch and a disconnect switch, of means affording and preventing operation of said disconnect switch having a locking device adapted to lock said means in the condition preventing switch operation, a key element adapted for actuating said locking device, said locking device being arranged to permit removal of said key element therefrom only when said means is in the condition preventing switch operation, power actuated means for operating said main switch, a controller adapted to interrupt the supply of power to said power actuated means having a movable member adapted to be moved into positions for rendering said power actuated means operative and inoperative to close said main switch, said movable member being formed to be actuated by said key element, and arranged to prevent removal of said key element therefrom when in said operative position and to prevent removal thereof when in said operative position, and interlocking mechanism actuated by said main switch for preventing movement of said movable member to inoperative position when said main switch is closed.

6. In an electrical distributing system, the combination with a main switch and a disconnect switch, of means affording and preventing operation of said disconnect switch having a locking device adapted to lock said means in the condition preventing switch operation, a key element adapted for actuating said locking device, said locking device being arranged to permit removal of said key element therefrom only when said means is in the condition preventing switch operation, power actuated means for operating said main switch, a controller adapted to interrupt the supply of power to said power actuated means having a movable member adapted to be moved into positions for rendering said power actuated means operative and inoperative to close said main switch, said movable member being formed to be actuated by said key element, and arranged to prevent removal of said key element therefrom when in said operative position and to prevent removal thereof when in said operative position, and interlocking mechanism including a detent member mounted in said controller, provided with a connection for mechanical actuation by said main switch and adapted to engage with said movable member when said main switch is closed for preventing movement of said movable member to inoperative position when said main switch is closed.

7. In an apparatus for controlling the sequence of operations of a plurality of electrically associated switches, the combination with means controlling a circuit control device movable to permit or to prevent operation of a selected switch and including a movable member for actuation by and for indicating the position of said selected switch, of a key element adapted to effect said movement, said device, movable member and key element being cooperable to effect the inseparable association of said key element and device in one position of the latter and to prevent movement of said device from said one position by said key element in one position of said movable member and to permit separable disengagement of said key element and said device only in the respective opposite positions of said movable member and said device, and means associated with said selected switch and actuated thereby for engagement with said movable member when in said one position.

8. In an apparatus for controlling the sequence of a plurality of electrically associated switches, a controlling device adapted for controlling power to the actuating mechanisms of said switches comprising a casing, a member pivotally mounted therein adapted to be moved into one position permitting the supply of power to said power actuating mechanism and to another position rendering said power actuating mechanism inoperative, and a key operated barrel member adapted to actuate said pivotal member, said barrel member arranged to prevent removal of said key element therefrom when in the power-supplying position and to permit removal therefrom when in said inoperative position, and locking means in said casing adapted to engage with said barrel member when in said power-supplying position.

In testimony whereof I affix my signature.

DON L. GALUSHA.